No. 816,624. PATENTED APR. 3, 1906.
T. B. WAGNER.
MACHINE FOR MOLDING LUMP STARCH.
APPLICATION FILED NOV. 26, 1904.
5 SHEETS—SHEET 1.
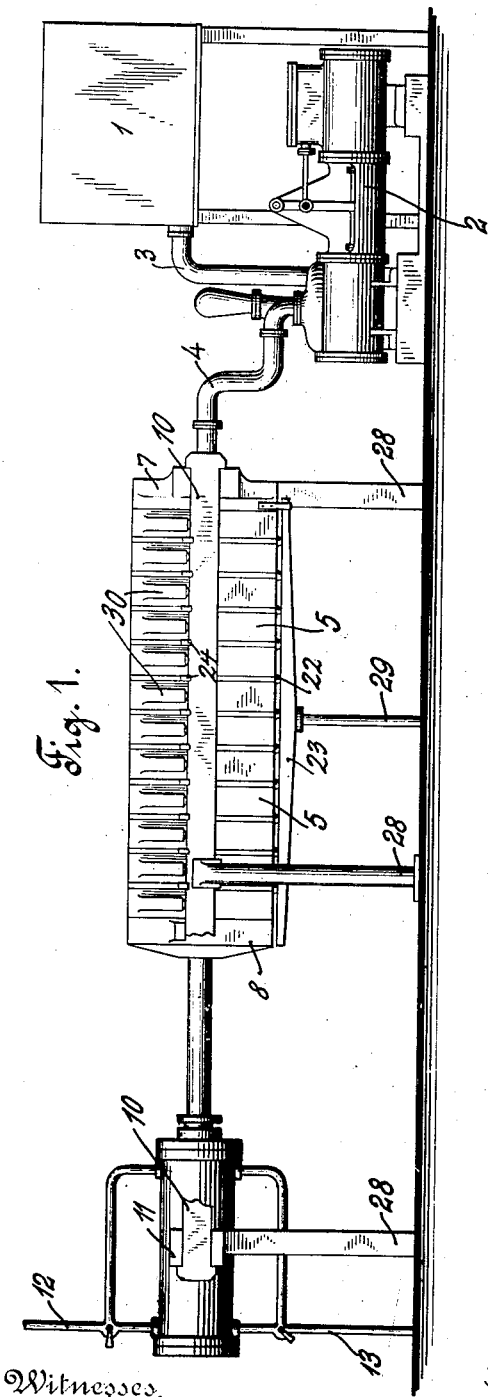
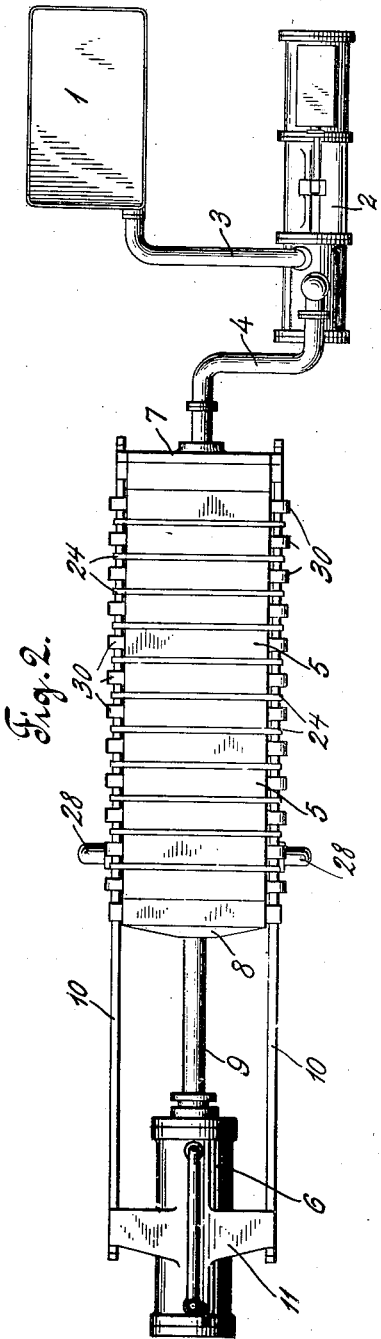
Theodore Brentano Wagner, Inventor
By his Attorney
Witnesses No. 816,624. PATENTED APR. 3, 1906.
T. B. WAGNER.
MACHINE FOR MOLDING LUMP STARCH.
APPLICATION FILED NOV. 26, 1904.
5 SHEETS—SHEET 2.
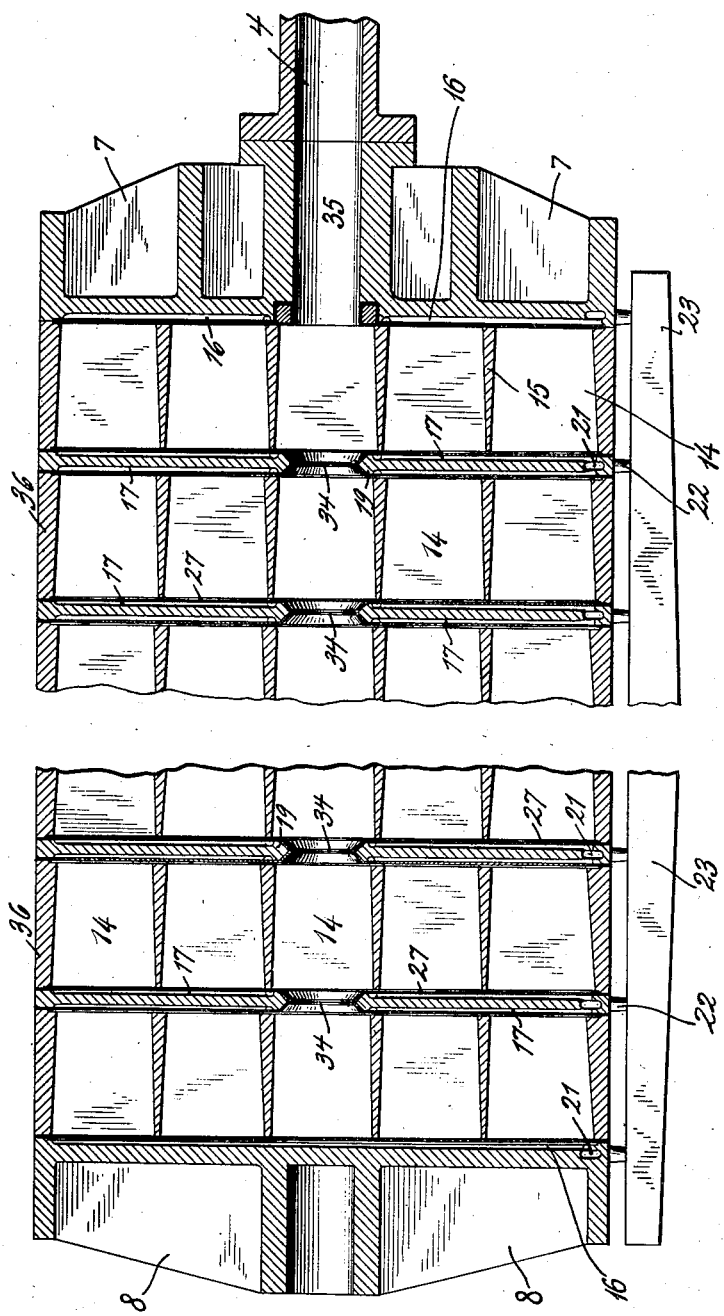

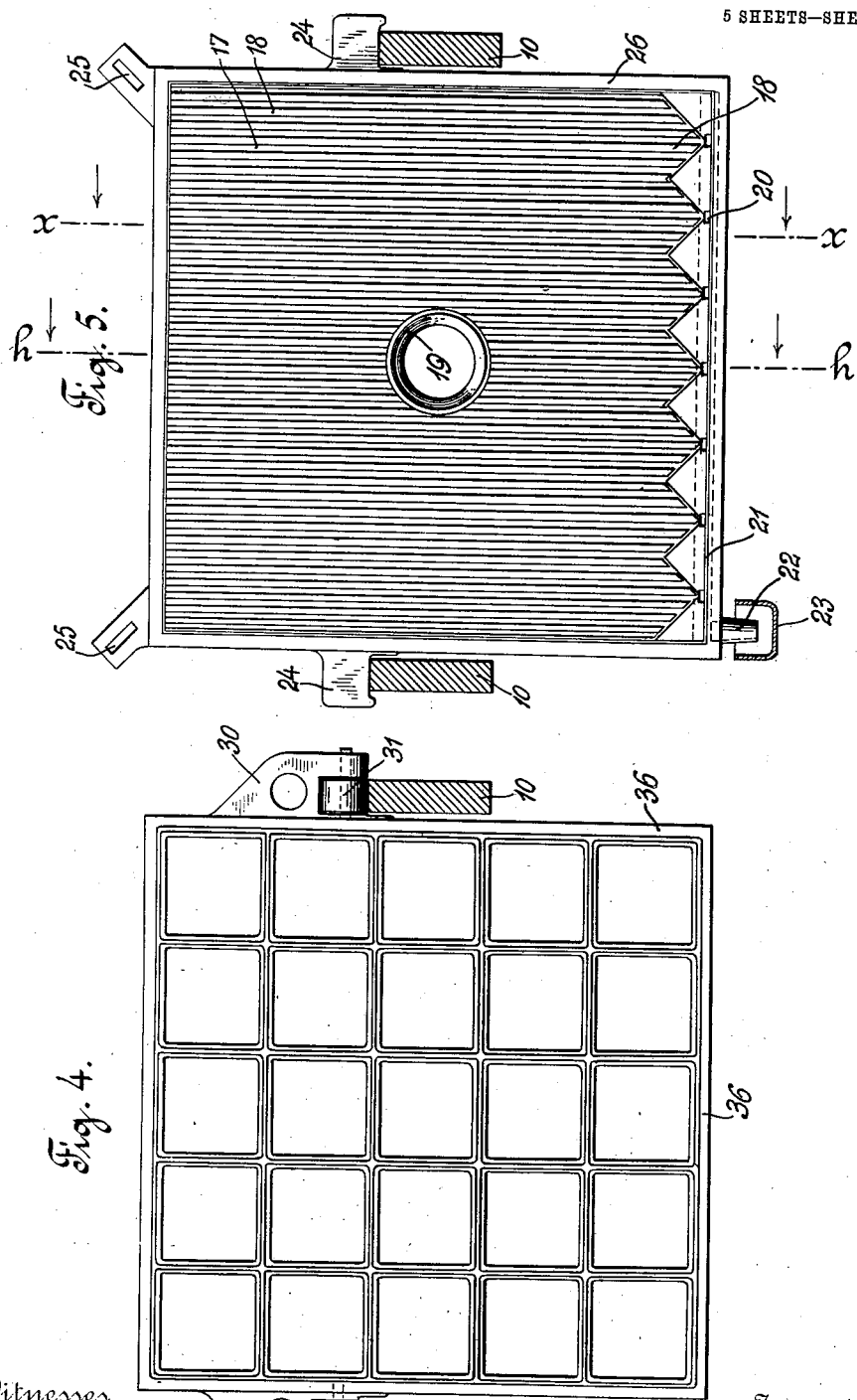

No. 816,624. PATENTED APR. 3, 1906.
T. B. WAGNER.
MACHINE FOR MOLDING LUMP STARCH.
APPLICATION FILED NOV. 26, 1904.
5 SHEETS—SHEET 4.
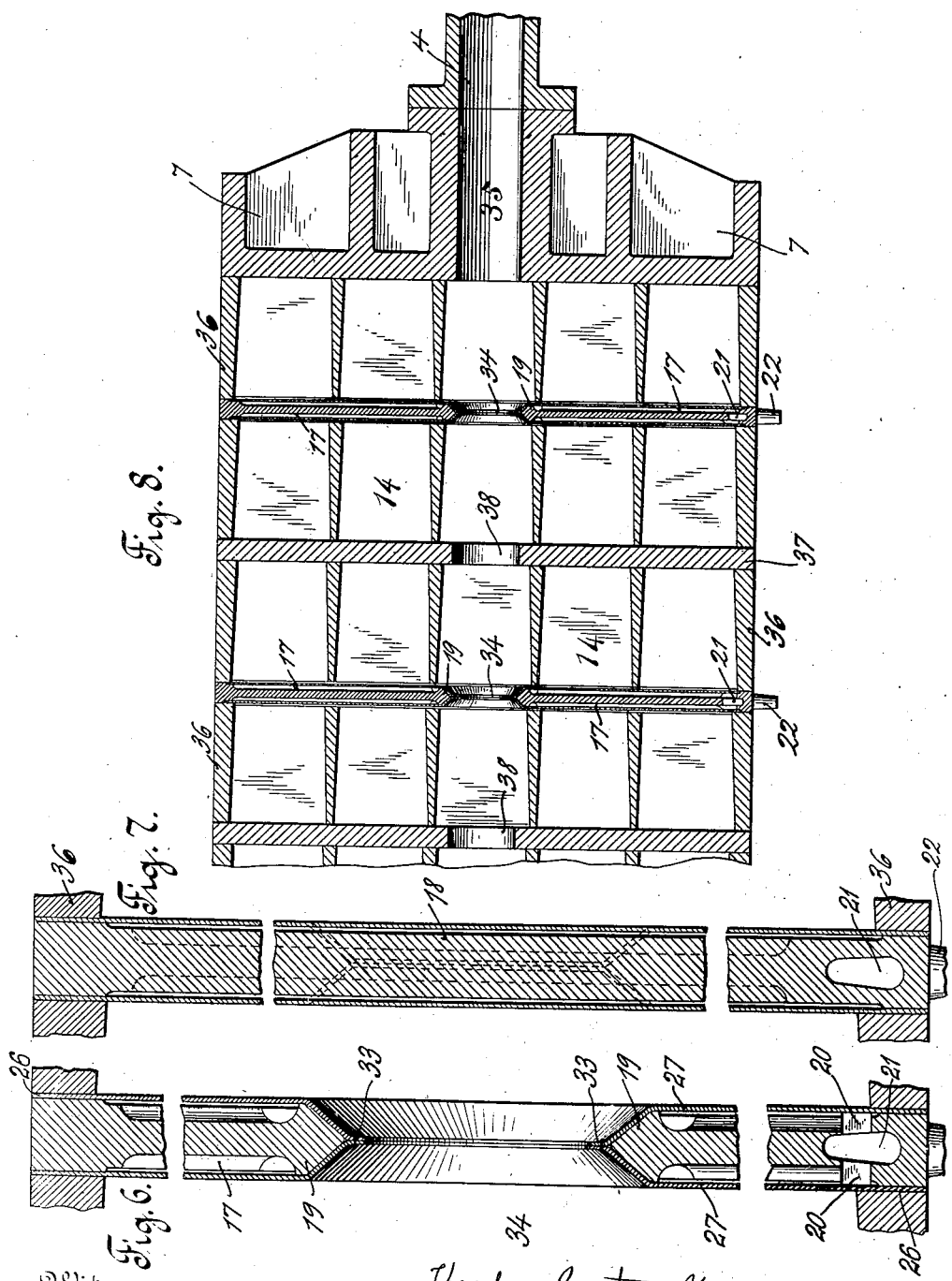

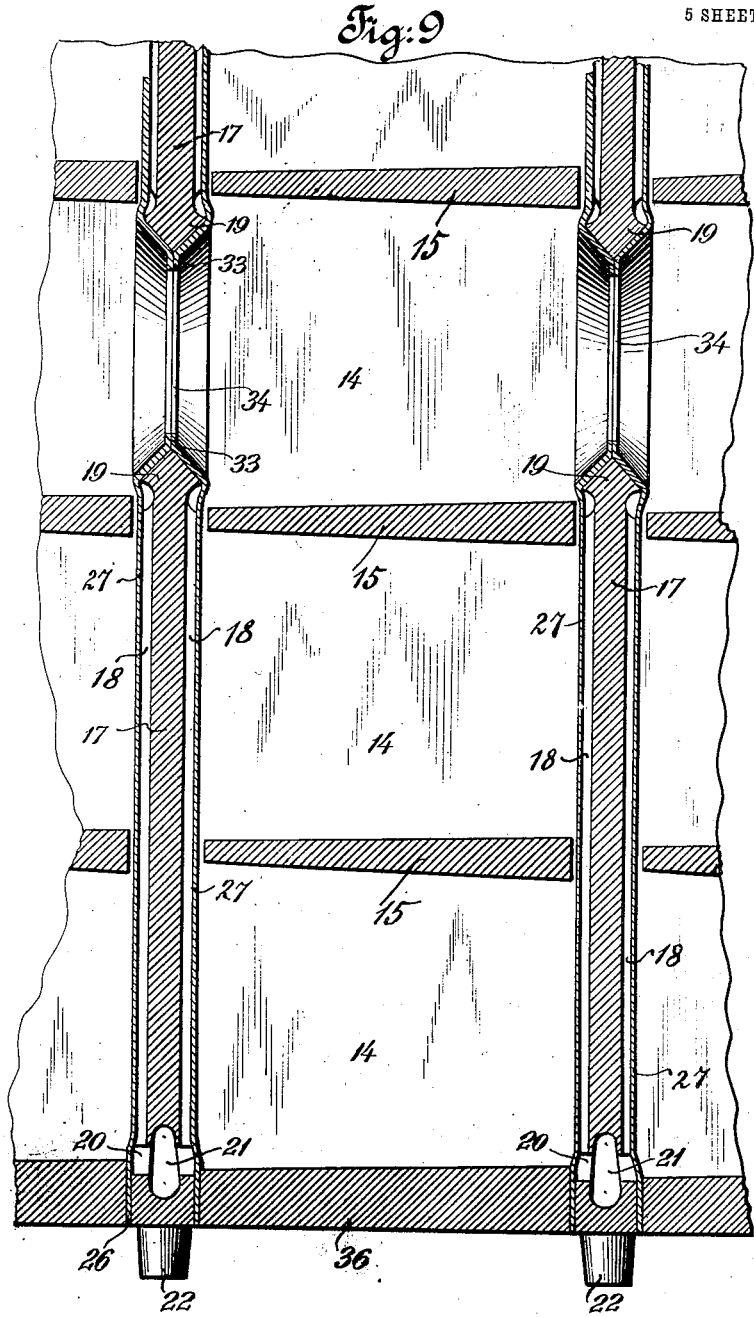

UNITED STATES PATENT OFFICE.

THEODORE BRENTANO WAGNER, OF CHICAGO, ILLINOIS.

MACHINE FOR MOLDING LUMP-STARCH.

No. 816,624.　　　　Specification of Letters Patent.　　　　Patented April 3, 1906.

Application filed November 26, 1904. Serial No. 234,414.

*To all whom it may concern:*

Be it known that I, THEODORE BRENTANO WAGNER, a citizen of the United States, residing in Chicago, in the county of Cook and State of Illinois, have invented a new and useful Machine for Molding Lump-Starch, of which the following is a specification.

The object of my invention was to devise a machine which avoids the necessary time, labor, and factory room, equipment and repairs required in the methods heretofore used, wherein it was necessary to allow the water to escape from the starch-milk by gravity, requiring some twenty-four hours, and then cutting the large mass into cubes for the crusting-kiln or wherein it was necessary to dry the starch until it contained about twenty per cent. of water and then subjecting it to a boiling heat and drying the resulting coherent mass in any desired manner, and I accomplish the object by the use of the molding-machine hereinafter described, and illustrated in the drawings annexed hereto and forming part hereof, in which similar numerals of reference refer to similar parts throughout the several views.

Referring to the drawings, Figure 1 is an elevation of the entire machine, showing the feed-inlets, mold-plates, and the filter-plates, together with the means for holding all of these plates in juxtaposition during the molding operation. Fig. 2 is a plan view of the apparatus shown in Fig. 1. Fig. 3 is a sectional view of the interior of the molding apparatus. Fig. 4 is a view of one of the mold-plates. Fig. 5 is a view of one of the filter-plates. Fig. 6 is a sectional view of Fig. 5 on the line *y y*. Fig. 7 is a sectional view of Fig. 5 on the line *x x*. Fig. 8 is a sectional view of a modification of the apparatus. Fig. 9 is a sectional view showing, on a larger scale, the construction of the inlets from the source of supply to the mold-chambers and the arrangement of the cloths and filter-plates, which is also illustrated in Fig. 6.

Referring to the drawings the construction of the apparatus is as follows:

1 is a tank for containing the starch and water or starch-milk.

2 is a pressure-pump for pumping the starch-milk into the molding apparatus.

3 is a pipe connecting the tank 1 to the pump 2; and 4 is a pipe running from the pump to the molding apparatus.

5 is the molding and filtering device.

6, Fig. 2, is the hydraulic cylinder containing the piston-rod. The movable head 8 is forced toward the fixed head 7, thus causing the mold-plates and the filter-plates to be clamped together.

9 is the piston-rod of the hydraulic cylinder, and 10 10 are the bars upon which the filter-plates are hung. 11 is a connecting-plate between said bars and the hydraulic cylinder.

12 is an inlet-pipe for the water to the hydraulic cylinder, and 13 is an outlet-pipe.

14 14 are mold-plates having openings or cells in the shape of a frustum of a pyramid and of the size required for the cubes of starch to be molded.

15 15 are division-walls in the mold-plate between the cells of the mold-plates.

16 16 are the inner ribbed surfaces of the fixed and movable heads of the molding apparatus.

17 17 are the filter-plates, having ribs 18 and central openings 19. In the form of apparatus which I prefer one of these filter-plates is placed between every two of the mold-plates.

20 20, Fig. 6, are communicating ports from each side of the filter-plates to the common longitudinal drain 21, from which suspends the drip-pipe 22, leading into the trough 23.

24 24 are lugs on the filter-plates which carry them on the frame or bars 10.

25 25 are slotted lugs whereby the filter-plates can be removed from the bars 10.

26 is a raised frame around each of the filter-plates, which enables them to be clamped in juxtaposition to the mold-plates.

27 27 are filter-cloths around and covering the surface of the filter-plates, and these are made in the following way: Two cloths, square in shape and approximately of the size of the surface of the filter-plates, are sewed together with the stitching 33, formed in a circle of the size of the central opening 34 in the filter-plates, and the interior of this circle of cloth is then cut out. The cloths are then adjusted over each half of the filter-plates, so that both sides of the filter-plates are covered with cloth overlying the ribs, and the cloth is kept in position when the filter-plates and the mold-plates are locked together by the action of the hydraulic cylinder 6.

28 28 are standards for the apparatus.

29 is a waste-pipe leading from the trough 23.

30 30 are bearings which carry the rollers 31, upon which the mold-plates move upon the frame or bars 10, and these bearings 30 are provided with lifting-holes 32, by which the mold-plates can be removed from the machine.

34 34 are openings in the filter-cloths covering the filter-plates.

The fixed head 7 is provided with the opening 35, into which the inlet-pipe 4 for the starch-milk leads.

36 is the resting-frame around the edges of each of the mold-plates.

In Fig. 8 is shown a modification which differs only from my preferred form of machine in that instead of placing a filter-plate covered with cloth between each two mold-plates there is a plain plate having a central opening or feed-hole 38.

The operation of my machine is as follows: The mold-plates 14, with the filter-plates 17, covered with cloth, between them, having been clamped together between the movable and fixed heads 8 and 7 by means of the hydraulic cylinder 6, the starch-milk supplied to the tank 1 is forced by the pump 2 through pipe 4 and opening 35 into the series of molds and filter-plates. It passes through the central openings 19 into and through the filtering-cloths and the molds 14, in which the starch is retained, while the water under the continued pressure of the pump passes down between the ribs of the filter and through the openings 20 into the channel 21, pipes 22, through 23, and out through the waste-pipe 29. Fig. 9 shows more clearly the separation of the starch from the water in the starch-milk. Thus the starch-milk entering through the ports 34 under pressure will force back the cloths 27 against the ribs 18 of the filter-plates 17, and thus leave a channel at either side of the division-walls 15 of the mold-plates, the water passing through the cloths and escaping through the ribbed channels down to the outlets 21. The cells of the molds 14 are thus gradually filled with starch free or practically free from water, and the mold-plates are then removed from the machine and the starch cubes ejected therefrom and are ready for the crusting-kilns. The whole operation requires about fifteen minutes.

In my preferred form of apparatus, where a filter-plate abuts against each end of the mold-plates, the water is removed from each end of the cake of starch which is being formed in the mold-plates. There is a modification shown in Fig. 8 of the drawings in which a solid or plain plate 37, with a central opening 38, is introduced on one side of each of the mold-plates, so that the water from the starch-milk finds an exit only from the mold through the filtering-plate covered with cloth.

In order to facilitate the removal of the masses of starch at the end of the operation, the cells or compartments of the mold-plates 14 are made with round corners and slightly-tapering sides, the division-walls between the cells being thicker at one side of the molding-plate than at the other side, as shown in the drawings. This affords easy removal of the block of starch from the mold-cell.

Of course it will be understood that the feed-inlets to the mold-plates may be placed at any desired points, and preferably should be so distributed, if there are more than one, that the starch-water will be evenly distributed. So, likewise, it will be understood that the machine containing the mold-plates may be erected perpendicularly instead of horizontally, as illustrated, and without departing from the spirit of my invention.

In a separate application, filed November 26, 1904, Serial No. 234,322, I have claimed the process of molding starch above described, and I therefore do not claim such process in this application; but, Having described my new machine, what I do claim is—

1. In a machine for molding starch, the combination of one or more mold-plates containing cells; one or more filter-plates, means for clamping said mold-plates and filter-plates together; means for forcing starch-milk under pressure into the cells of the mold-plate or mold-plates; and means for carrying off the water expressed from the starch-milk, substantially as described.

2. In a machine for molding starch, the combination of (a) one or more mold-plates containing cells having tapering sides; (b) one or more filter-plates interposed between said mold-plates; (c) means for clamping said mold-plates and filter-plates together; (d) means for forcing starch-milk under pressure into the cells of the mold-plates; and (e) means for carrying off the water expressed from said starch-milk, substantially as described.

3. In a machine for molding starch, the combination of (a) one or more removable mold-plates containing cells having tapering sides; (b) one or more removable filter-plates interposed between said mold-plates; (c) means for clamping said mold-plates and filter-plates together; (d) means for forcing starch-milk under pressure into the cells of the mold-plates; and (e) means for carrying off the water expressed from the starch-milk, substantially as described.

4. In a machine for molding starch, the combination of (a) one or more removable mold-plates containing cells; (b) one or more removable filter-plates interposed between said mold-plates; (c) bars upon which the mold-plates and filter-plates are carried; (d) means for clamping said mold-plates and filter-plates together; (e) means for forcing starch-milk under pressure into the cells of the mold-plates; and (f) means for carrying off the water expressed from the starch-milk, substantially as described.

THEODORE BRENTANO WAGNER.

Witnesses:
P. MILLER,
M. WOOD.